United States Patent [19]
Dehrmann et al.

[11] Patent Number: 5,669,474
[45] Date of Patent: Sep. 23, 1997

[54] HYDRODYNAMIC TORQUE CONVERTER WITH LOCK-UP CLUTCH

[75] Inventors: Uwe Dehrmann, Würzburg; Peter Volland, Rannungen; Hans-Wilhelm Wienholt, Dortmund, all of Germany

[73] Assignee: Fichtel & Sachs AG, Schweinfurt, Germany

[21] Appl. No.: 527,760

[22] Filed: Sep. 13, 1995

[30] Foreign Application Priority Data

Sep. 14, 1994 [DE] Germany ............... 44 32 624.6

[51] Int. Cl.⁶ .................... F16H 45/02; F16D 13/72
[52] U.S. Cl. ................ 192/3.29; 192/70.12; 192/107 R; 192/113.36
[58] Field of Search ............ 192/3.29, 113.36, 192/70.12, 107 R, 113.31

[56] References Cited

U.S. PATENT DOCUMENTS

| | | | |
|---|---|---|---|
| 3,534,842 | 10/1970 | Davison | 192/113.36 |
| 3,972,400 | 8/1976 | Howells. | |
| 4,986,397 | 1/1991 | Vierk. | |
| 5,094,331 | 3/1992 | Fujimoto et al.. | |
| 5,460,255 | 10/1995 | Quigley | 192/113.36 |
| 5,501,309 | 3/1996 | Walth et al. | 192/3.29 |

FOREIGN PATENT DOCUMENTS

| | | |
|---|---|---|
| 2546594 | 11/1984 | France. |
| 1804621 | 6/1969 | Germany. |
| 4121586 | 1/1993 | Germany. |
| 4420959 | 1/1995 | Germany. |
| 4-300447 | 10/1992 | Japan ............... 192/3.29 |
| 6-42606 | 2/1994 | Japan ............... 192/3.29 |
| 1510713 | 5/1978 | United Kingdom. |
| 2280733 | 2/1995 | United Kingdom. |
| 2285851 | 7/1995 | United Kingdom. |

*Primary Examiner*—Rodney H. Bonck
*Attorney, Agent, or Firm*—Nils H. Ljungman and Associates

[57] ABSTRACT

A hydrodynamic torque converter is designed with a lock-up clutch which comprises a piston which can be extended in the axial direction and can be connected by at least one friction lining to the converter housing. The friction lining is designed with a multiplicity of depressions for the flow of hydraulic fluid, preferably oil, from the converter circuit, whereby the depressions extend between the radially outside edge and the radially inside edge of the friction lining in the circumferential direction at a specified angle, with a changing radial distance from the axis of rotation of the friction lining. Each depression changes its longitudinal direction between each inlet and outlet for the oil at least once, so that its radial component is oriented opposite to its orientation before the change.

20 Claims, 12 Drawing Sheets

HYDRODYNAMIC TORQUE CONVERTER WITH LOCK-UP CLUTCH

BACKGROUND OF THE INVENTION

1. Field of the Invention

The present invention relates to a hydrodynamic torque converter with a lock-up clutch that includes a piston which can be extended in the axial direction, and can be connected to the converter housing by means of at least one friction lining.

2. Background Information

U.S. Pat. No. 3,972,400 discloses a friction lining as it could be used, for example, on the piston of a lock-up clutch. This friction lining has a multiplicity of depressions which extend both in the radial direction and at a specified angle with respect to the radial direction. One feature all the depressions have in common is that each of them has its own inlet and its own outlet, and connects the radially outside edge of the friction lining with the radially inside edge over the shortest possible path, namely always in a straight line. The individual depressions are connected to one another by means of a helicoidal channel in the friction lining.

In the example shown, the hydraulic fluid, e.g., oil, flows through the depressions between the inlet and the outlet in a straight line path which represents the shortest possible distance. Understandably, the cooling action on the friction lining which can be thereby achieved is low, on account of the brief time the oil remains in the channel, for which reason the connections are supplemented by the additional helicoidal channel. Although the length of time the oil remains in this channel is significant, which might result in a sufficient heat exchange, tests have shown that an excessive surface pressure can thereby be exerted on the friction lining.

OBJECT OF THE INVENTION

An object of the present invention is the provision of a friction lining on a piston of a lock-up clutch of a hydrodynamic torque converter in which, when oil flows through depressions in the friction lining, the maximum possible amount of heat can be absorbed, without an excessive load being exerted on the friction lining.

SUMMARY OF THE INVENTION

According to the invention, the longitudinal direction of each recess can be changed at least once between an inlet and an outlet for the hydraulic fluid, e.g. oil, namely so that the radial component of the new longitudinal direction is opposite to the direction before the reversal. Consequently, the oil undergoes a throttling action in the vicinity of the reversal, and is thus able to absorb an increased amount of heat. As a result of the reversal, the oil does not travel through the friction lining by means of the shortest possible path, but reaches the corresponding outlet by means of an indirect route. The oil thus has a longer dwell time, during which heat can be absorbed, before it leaves the friction lining. As a function of the design of the depressions, there can even be a multiplicity of additional reversals before the oil reaches the outlet. In general, the number of reversals located one after another in a depression is a function of how much heat must be absorbed from the friction lining over the entire length of the depression. Additional criteria for an effective transfer of heat are the cross section of the depression, the cross section of the inlet and outlet, and the curvature of the depression at a reversal. When configured in this manner, a great deal of heat can be absorbed from the friction surface, although sufficient friction surface remains between the individual depressions to limit the surface pressure.

As a result of the location of a reversal of a depression on each edge of the friction lining, the depressions penetrate the friction lining over almost its entire width, and cooling oil can thus flow through practically the entire friction lining. The possibility of local overheating is therefore greatly reduced.

The depression preferably has an expanded portion in the vicinity of a reversal. This expanded portion acts as a reservoir for oil, so that an even greater cooling action is achieved in the vicinity of such an expanded portion.

Possible advantageous refinements of the depressions are disclosed as a result of which, with the fewest possible inlet and outlet points, the number of channels through which oil flows in a depression can be comparatively high. The result is an even more uniform cooling of the friction lining over its entire width.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In general, the invention features a hydrokinetic torque converter, the hydrokinetic torque converter including a lockup clutch, the hydrokinetic torque converter comprising a torque input shaft defining a rotational axis, a torque output shaft, a converter housing, the converter housing comprising means for being driven by the torque input shaft, a pump wheel disposed within the converter housing and comprising means for being driven by the converter housing, a turbine wheel disposed within the converter housing and in spaced opposition to the pump wheel along the rotational axis, the turbine wheel comprising means for for driving the torque output shaft, a piston in spaced opposition to the converter housing along the rotational axis, at least one friction lining disposed between the piston and the converter housing, the piston being displaceably along the rotational axis to abut the at least one friction lining, a first fluid chamber containing a substantially viscous fluid, the first fluid chamber being disposed between the converter housing and the piston, a second fluid chamber containing the substantially viscous fluid, the second fluid chamber being disposed within the converter housing and surrounding the pump wheel and the turbine wheel, at least one fluid passage for the flow of the substantially viscous fluid between the first and second fluid chambers, through the at least one fluid passage, the at least one fluid passage extending adjacent the at least one friction lining, and the at least one fluid passage having at least one portion thereof that is substantially nonlinear.

BRIEF DESCRIPTION OF THE DRAWINGS

The invention is explained in greater detail below with reference to several embodiments which are illustrated in the accompanying drawings.

FIG. 7b shows substantially the same view as FIG. 7, but shows additional components.

FIG. 7c shows a schematic diagram of the multi-way valve in reverse from the position shown in FIG. 7a.

DESCRIPTION OF THE PREFERRED EMBODIMENT

Figure 1:
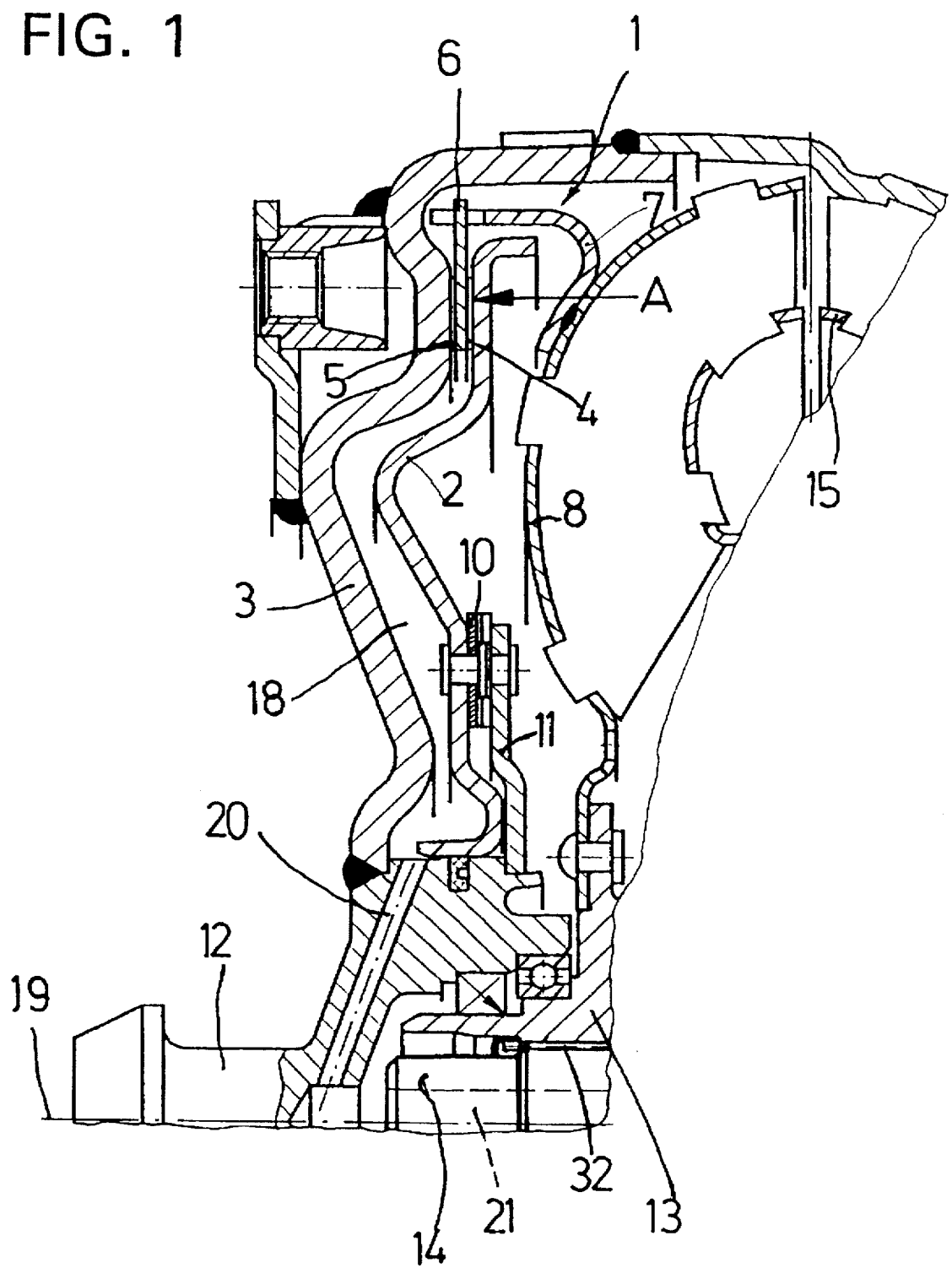
FIG. 1 shows the upper half of a longitudinal section through a lock-up clutch on a torque converter which has two friction linings.

FIG. 1 shows the area of a hydrodynamic (or "hydrokinetic") torque converter in which there are provided friction linings for the transmission of a torque from the converter housing through a piston of the lock-up clutch to an output shaft. The entire torque converter is not initially illustrated or described in detail in this particular figure, because such torque converters are described in publications of the prior art, e.g., German Patent No. 41 21 586 A1. Additionally, a torque converter is described in more detail hereinbelow.

The lock-up clutch 1 illustrated in FIG. 1 has a piston 2 which in the radially outer area is provided with a flat surface on its side facing a converter housing 3. Between the flat surface on the piston 2 and a likewise flat area provided on the converter housing 3 hangs a disc 6, which disc 6 is held non-rotationally, but so that it can move axially, on a disc carrier 7, which for its part is fastened to the turbine wheel 8. Friction linings 4 and 5 are fastened to the opposite faces of the disc 6.

The piston 2 is connected in its radially inner area, by means of a spring 10, to a bracket 11, which bracket 11 is crimped onto an extension of a pin 12. The pin 12 can be permanently fastened to the converter housing 3. The piston 2 is held in contact under the action of the hydraulic medium, e.g. oil, which is fed through the converter, by means of the friction linings 4 and 5 and the disc 6, with the converter housing 3, unless as disclosed by German Patent No. 41 21 586 A1, there is a chamber 18 provided between the converter housing 3 and the piston 2, which is pressurized at a pressure which is greater than the pressure on the side of the piston 2 farther from the converter housing 3. As a function of the pressure conditions on the two sides of the piston 2, the piston 2 is either in a frictional connection with the converter housing 3, so that by means of the friction linings 4 and 5 and the disc 6, and the disc carrier 7, the rotation of the converter housing 3 can be transmitted to the turbine wheel 8 and from the latter to the turbine hub 13 on an output shaft 14, which output shaft 14 is non-rotationally held in the turbine hub 13 by means of gear teeth 32. On the other hand, the piston 2 can be separated from the disc 6 and thus from the converter housing 3, so that the drive motion of the converter housing 3 is transmitted via the pump wheel 15, with slip, to the turbine wheel 8, and from there via the turbine hub 13 to the output shaft 14.

The piston 2 is designed without a torsional vibration damper. Therefore it may be necessary to control the application force of the piston 2 against the disc 6 and the converter housing 3, so that if rotational impacts are introduced via the converter housing 3, there can be some slip between the friction linings 4 and 5 and the disc 6. But, the advantage of a vibration damper in terms of the friction is offset to some extent by the increased need to cool the converter components such as the converter housing 3, the disc 6 and the piston 2. Therefore, the invention teaches that the oil fed through the converter is introduced via radially outwardly disposed entrances to the friction linings 4 and 5, and the oil flows through depressions 17, which depressions 17 are shown in FIGS. 2 to 6, and after flowing through the depressions 17, the oil is discharged via radially inwardly disposed ports provided in the friction linings 4 and 5. The oil can then be transported via the chamber 18 between the converter housing 3 and the piston 2, through holes 20, which holes 20 lead axially inwardly towards the axis of rotation 19, into the center of rotation of the torque converter, where the oil can flow back through a longitudinal hole 21 in the output shaft 14 into an oil reservoir.

Figure 2:
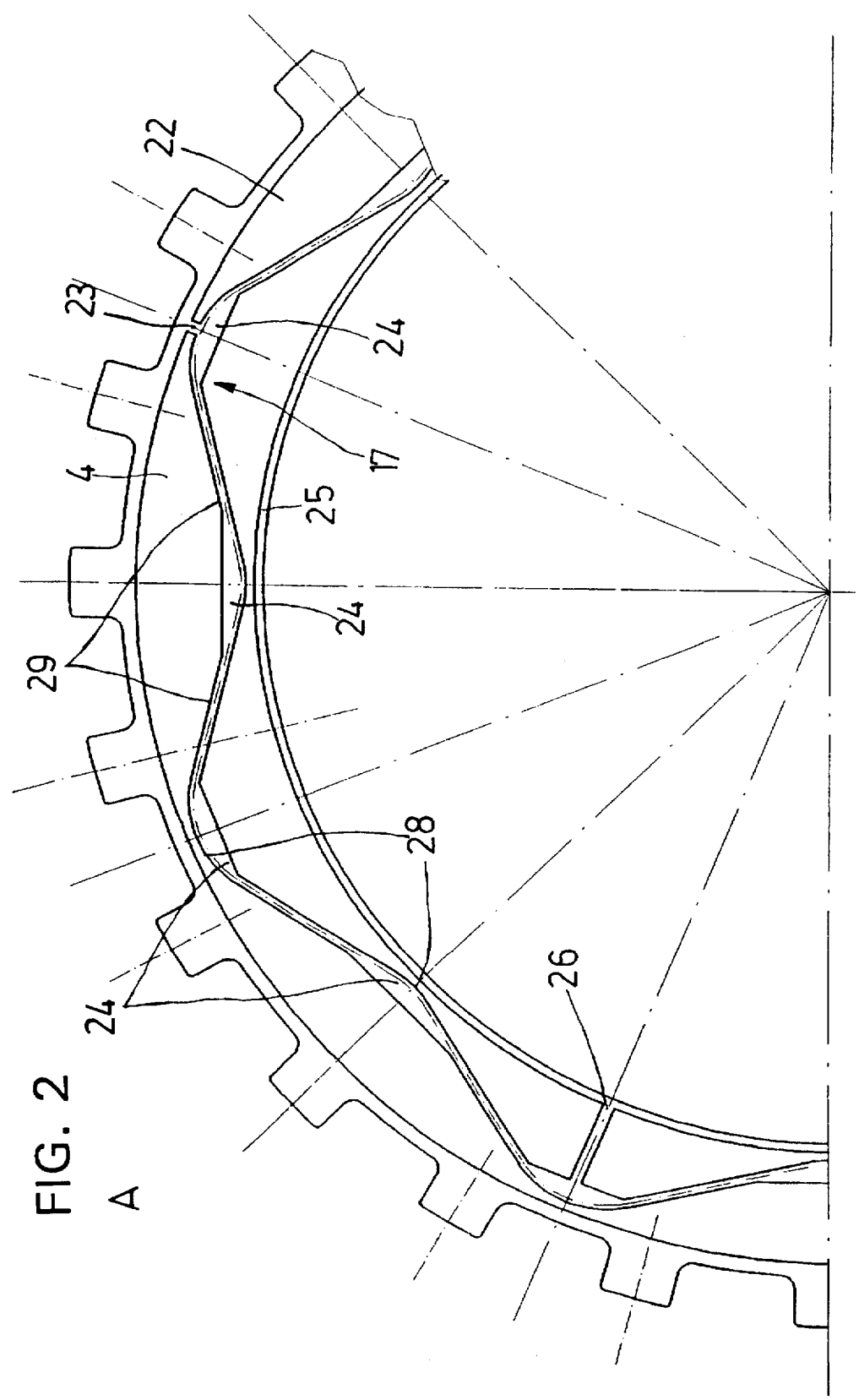
FIG. 2 shows a friction lining as illustrated in FIG. 1 to illustrate the depressions in detail, whereby between each inlet and outlet, the depressions each run several times between the radially outside edge and the radially inside edge of the friction lining.

To achieve the optimal cooling effect in the vicinity of the friction linings, the invention teaches that the path for the depressions 17 may be similar to those shown in the friction lining 4 illustrated in FIG. 2. For this purpose, for a depression 17 on the radially outside edge 22 of the respective friction lining 4 and/or 5 there is provided an inlet 23 which emerges in an expanded portion 24 of the depression 17. Starting from the expanded portion 24, the depression 17 continues in the form of channels 29 in the circumferential direction, whereby this continuation runs on both sides radially inward, until it almost reaches the radially inside edge 25 of the friction lining 4 and/or 5. At that point, the depression 17 has an additional expanded portion 24, and then runs radially outward via a channel, the cross section of which narrows once again, almost to the edge 22, where there is an additional expanded portion 24. The depression 17 can run back and forth with a number of such segments between the outside edge 22 and the inside edge 25 of the friction lining 4 and/or 5, until it reaches an outlet 26 which leads radially inward. Like the inlet 23, the outlet 26 is oriented perpendicular to the corresponding edge of the friction lining 4 and/or 5.

Oil which has entered the depression 17 via the inlet 23 is transported via the channels 29 so that it flows through practically the entire friction lining 4 and/or 5 from radially outward to radially inward. The multiplicity of reversals 28 through which the oil must flow until it reaches the outlet 26, thereby makes it possible to achieve a greater heat exchange than if the oil were to flow in a straight line. The heat exchange is further promoted by the fact that in the vicinity of a respective reversal 28, the depression 17 has an expanded portion 24 which defines an oil reservoir, and thereby enhances the cooling effect at this point. Since, viewed over the circumference of the friction lining 4 and/or 5, there are a multiplicity of such depressions 17, the converter elements next to the friction surfaces such as the converter housing 3, the piston 2 or the disc 6, can be cooled efficiently, without the need for an excessively large cooling surface, which in turn would result in excessive surface pressure on the friction linings.

Figure 3:
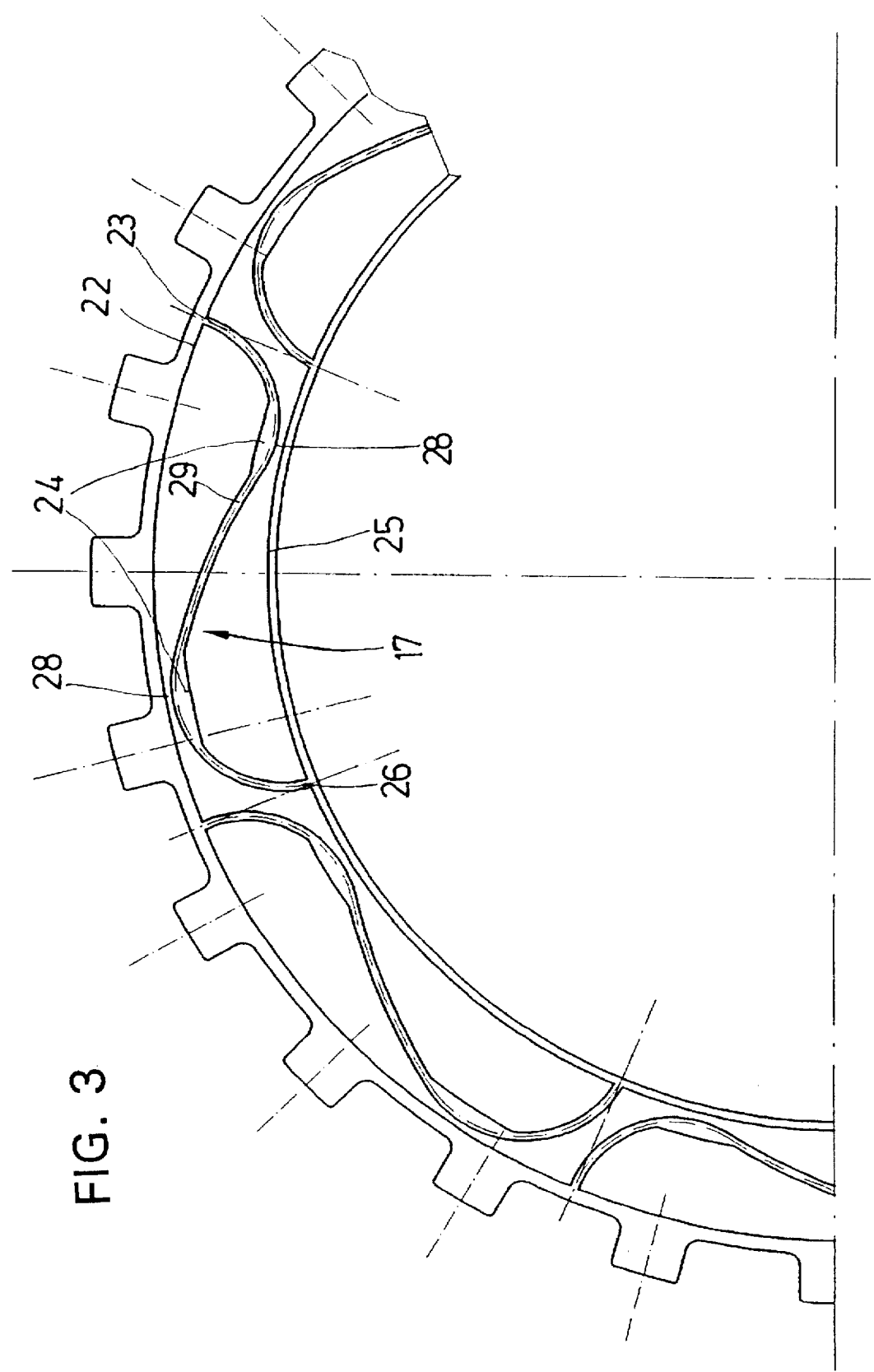
FIG. 3 is similar to FIG. 2, but with an inlet and outlet integrated into each depression.

FIG. 3 shows a variant of the depressions 17, whereby between each inlet 23 and the corresponding outlet 26, there are only two reversals 28, and accordingly only two expanded portions 24. Because these depressions 17 are shorter than those illustrated in FIG. 2, the time the oil remains inside the friction lining 4 and/or 5 is shorter, so that the heated oil is more rapidly replaced by cooler incoming oil. In this embodiment, likewise, practically the entire friction lining 4 and/or 5 is cooled as uniformly as possible from its radially outward edge 22 to its radially inward edge 25. The reversals 28 with the expanded portions 24 thereby provide the enhanced cooling action described above.

Figure 4:
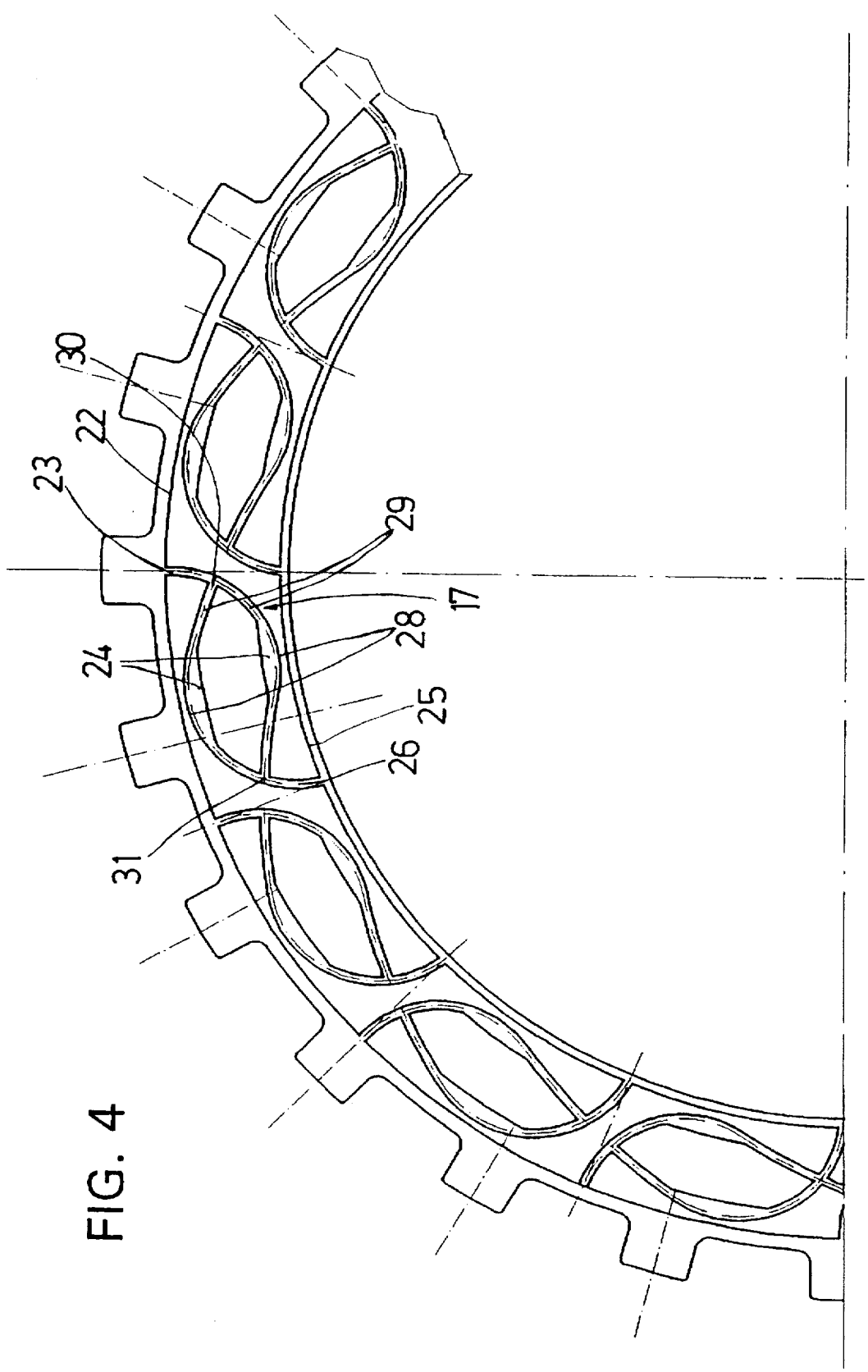
FIG. 4 is similar to FIG. 3, but with depressions which each have a branch or a junction adjacent to the inlet or outlet.

FIG. 4 shows depressions 17 which, between the respective inlet 23 and outlet 26, have one reversal 28 with one expanded portion 24 for each channel 29. In this case, the invention teaches that the inlet 23 may branch at 30 into two channels 29, which then both empty by means of a junction 31 into a common outlet 26. As a simple examination of the illustration shows, the largest possible surface area of the friction surfaces 4 and/or 5 can be cooled if the depressions 17 run in this manner.

Figure 5:
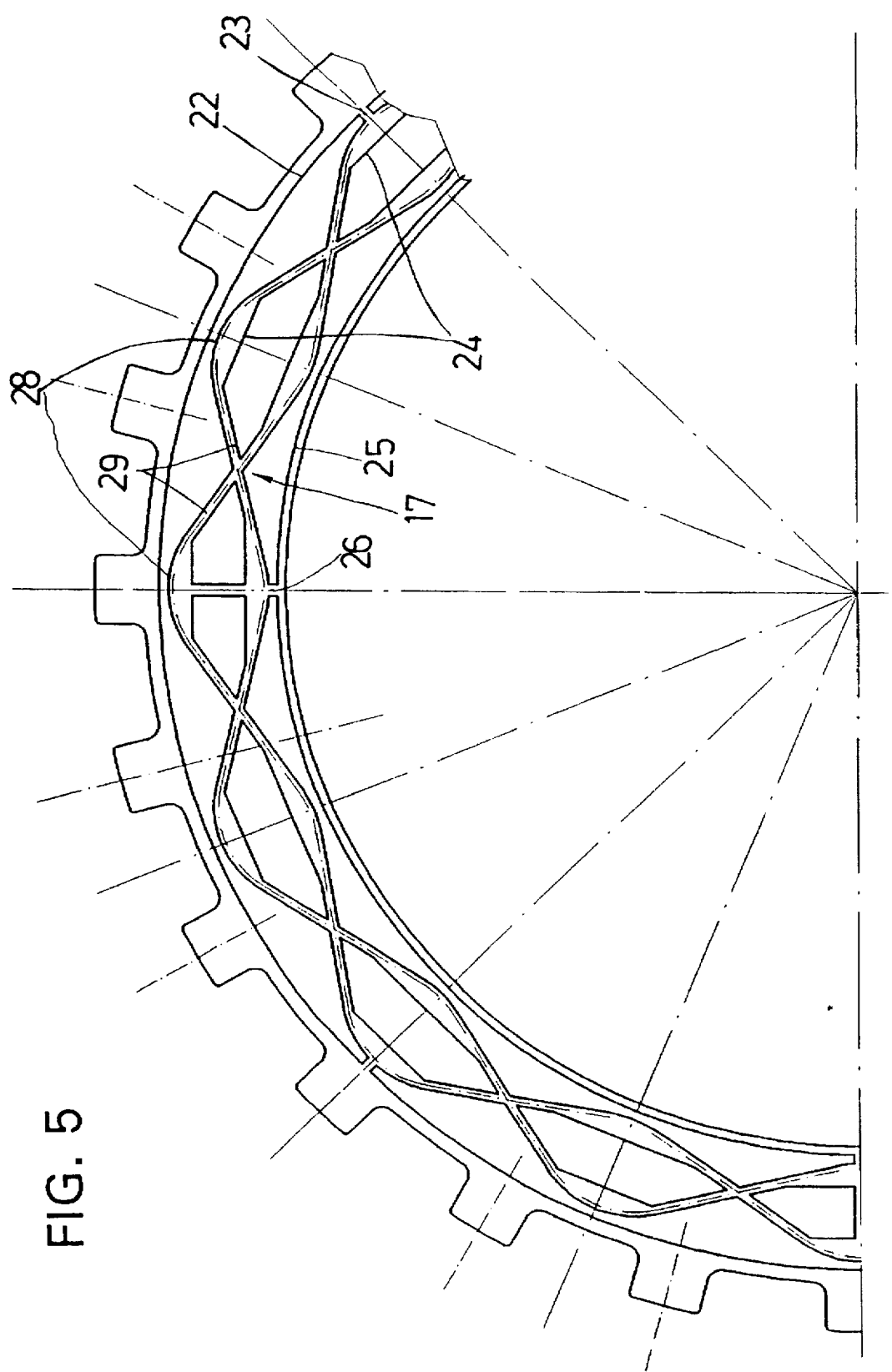
FIG. 5 is similar to FIG. 2, but with depressions in the friction lining which run in opposite directions.

The path of the depressions 17 illustrated in FIG. 5 is largely the same as illustrated in FIG. 4, but with the difference that between each inlet 23 and the respective outlet 26 there are a multiplicity of reversals 28, each with an expanded area 24. The time the cooling oil remains in the depressions 17 before it can leave the friction lining 4 and/or 5 can thereby be increased.

Figure 6:
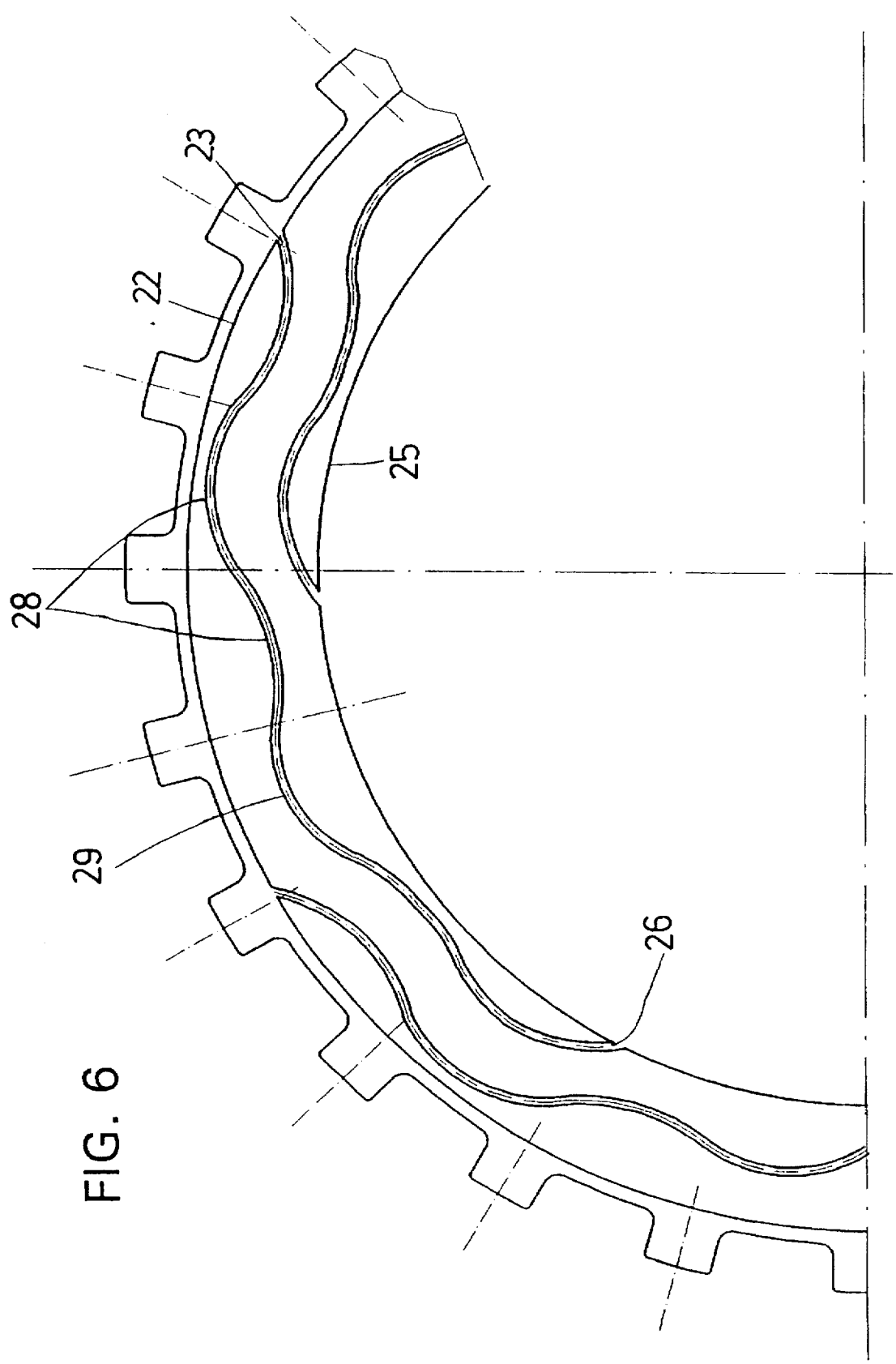
FIG. 6 is similar to FIG. 2, but with depressions which run only once between the radially outside edge of the friction lining and its radially inside edge.

FIG. 6 illustrates an embodiment of the friction lining 4 and/or 5 which differs from the embodiments illustrated above in that the inlet 23 empties without any transition into a channel 29, which of course has a multiplicity of reversals 28 before it empties, at the radially inward edge 25 of the friction lining 4 and/or 5, without any transition into the outlet 26, but the reversals 28 of this embodiment do not have an expanded portion 24. In this case, the reversals 28 themselves differ from the embodiments discussed above in that the channel 29 must pass through a comparatively large radius on the friction lining 4 and/or 5 before it has covered the radial distance between the outward edge 22 and the inward edge 25 of the friction lining 4 and/or 5. Nevertheless, to achieve a uniform cooling action, the depressions 17, as illustrated in FIG. 6, are arranged so that they overlap one another.

Of course, it is apparent that to achieve the desired effect, the friction lining 4 and/or 5 need not necessarily be provided with the depressions 17. It is also conceivable that the friction lining 4 and/or 5 could be smooth on their sides facing the converter elements 2 and 3, and the respective flat areas of the piston 2 and the converter housing 3 could be provided with depressions which follow a path like the one illustrated in FIGS. 2 to 6. It is also conceivable that friction linings 4 and/or 5 could be attached to the flat areas of the piston 2 and the converter housing 3, whereby these friction linings would have a smooth surface on their sides facing the disc 6. In this embodiment, the disc 6 would preferably be provided with depressions 17 on both sides, which would follow a path as illustrated in FIGS. 2 to 6.

FIGS. 7 through 9a illustrate a torque converter in which the present invention may be embodied.

Figure 7A:
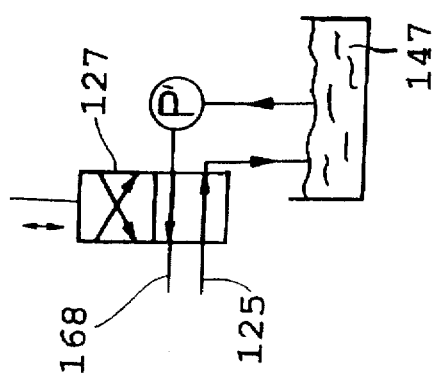
FIG. 7a shows a schematic diagram of a multi-way valve and a pump.
Figure 7:
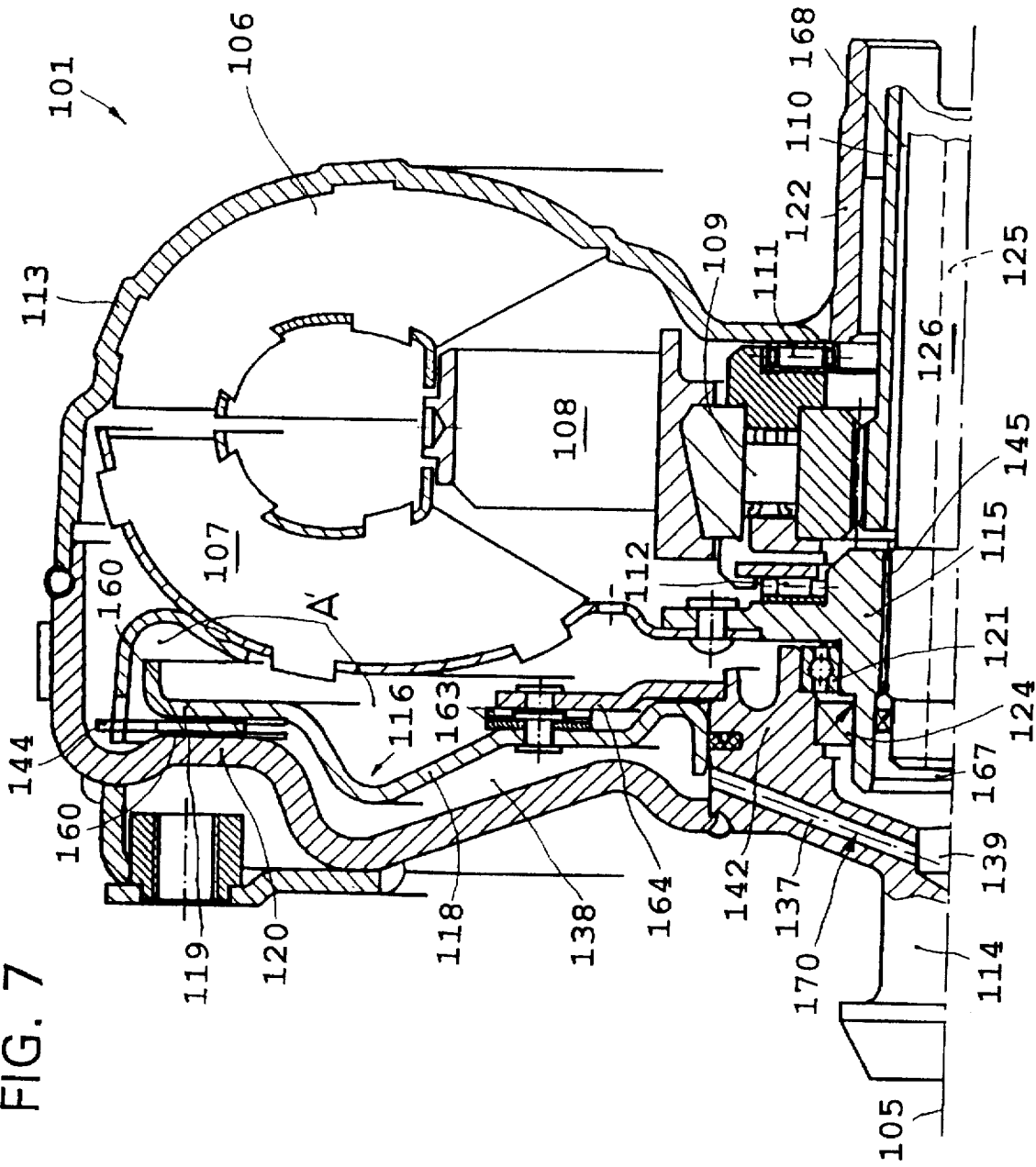
FIG. 7 shows the upper half of a longitudinal section through a torque converter with a lock-up clutch and flow passages in the form of holes which run radially inside the lock-up clutch to the axis of rotation, which holes empty at an axial distance from a driven shaft.

FIG. 7 shows a hydrokinetic torque converter 101 which generally includes a converter housing 113, the output side of which housing 113 can preferably be designed as a pump wheel 106 which empties into a tube 122. The tube 122 can preferably be mounted in a transmission (not shown), where it drives a pump P' (see FIGS. 7a and 7b) to feed the torque converter 101 with hydraulic fluid, preferably oil. The converter housing 113 can preferably enclose a lock-up clutch 116, which lock-up clutch 116 preferably includes a piston 118. The piston 118 can preferably be designed on its external circumference with a radial area 119 which can preferably extend in a parallel direction with respect to a radial area 120 of the converter housing 113. Between the converter housing 113 and the piston 118 there can preferably be a plate 144, which plate 144 can preferably have friction linings 160 on both sides thereof. The plate 144 can be brought into frictional contact, via the linings 160, with the areas 119 and 120 of the converter elements 118, 113, respectively. The areas 119 and 120, can preferably be designed with channels 29, in accordance with the present invention on each of their sides facing a friction lining 160.

The plate 144 can preferably extend radially outward beyond the piston 118, and in its radially outer region, the plate 144 can preferably be connected by means of a connecting flange 207a, to an outer shell 107a (see FIG. 7b) of a turbine wheel 107 in a substantially non-rotational, but axially movable manner. In accordance with one preferred embodiment of the present invention, the connecting flange 207a can be connected to the shell 107a by means of a weld 107b (see FIG. 7b). The piston 118 can also preferably be mounted in a non-rotational but axially movable manner on a bearing ring 142. The bearing ring 142 can preferably be integral with a bearing neck 114, which bearing neck 114 can be guided in a crankshaft (not shown) of an internal combustion engine, and can preferably be fastened to the converter housing 113, for example by means of a weld 113a (see FIG. 7b). The piston 118 can preferably be connected by means of leaf springs 163 to a ring plate 164, which ring plate 164 can be connected on its edges with the bearing ring 142. In accordance with one embodiment of the present invention, the ring plate 164 can preferably be connected to a flanged portion 142a (see FIG. 7b) of the bearing ring 142, possibly by a force fit or a weld (not shown). Preferably by means of the leaf springs 163, a bias of the piston 118 toward the converter housing 113 can be created.

The bearing ring 142 can preferably be located, on its end pointing away from the internal combustion engine, on a turbine hub 115 of the turbine wheel 107 by means of a bearing 121. The bearing ring 142 can preferably be sealed against the turbine hub 115 by means of a seal 124. The seal 124 can prevent a discharge of oil from a chamber A'. This chamber A' can preferably be formed by the turbine wheel 107 and the piston 118. The turbine hub 115 can preferably be mounted directly, by means of gear teeth 145, on a transmission-side output shaft 126. The output shaft 126 preferably extends toward the internal combustion engine to the vicinity of the bearing neck 114, and can preferably have a passage 125 in the form of a longitudinal hole. The passage 125 preferably empties on the driven side in the transmission and on the driving side in a space 167, which space 167 can preferably be located within the bearing neck 114.

The tube 122, in accordance with one embodiment, can preferably lead to the drive of the pump P' (see FIG. 7a), and can be substantially concentric to the driven shaft 126. Located in a radial space between the tube 122 and the driven shaft 126 there can preferably be a support shaft 110, which support shaft 110 can have a freewheel 109 for a stator 108. In accordance with one embodiment of the present invention, the tube 122 can preferably be disposed about the driven shaft 126. The stator 108 can preferably be supported on both sides in the axial direction by bearing elements 111 and 112, on one hand with respect to the converter housing 113, and on the other hand with respect to the turbine hub 115, respectively. Essentially all of the rotating parts of the hydrodynamic torque converter are oriented concentric to a hub axis 105. In the bearing neck 114, starting from the driven shaft 126, there can preferably be a blind hole 139 of the space 167, from which blind hole 139 several holes 137 can preferably extend in a substantially diagonal manner, and in a radially outward direction. The holes 137 can preferably extend into a chamber 138, which chamber 138 can preferably be formed between the piston 118 and the converter housing 113.

The space A' of the converter circuit can preferably be connected to the pump P' (see FIG. 7a) by means of a space 168, which space 168 is preferably enclosed by the support shaft 110. The space 168 can preferably lead from the pump P' via the spaces in the bearing element 112 into the pump wheel 106. A multi-way valve 127 (see FIG. 7a) is thereby located between the longitudinal hole 125 and the space 168 and between the pump P' and a reservoir 147 for converter fluid respectively.

In accordance with one embodiment, the converter can preferably function as follows:

In the illustrated position (see FIG. 7a) of the multi-way valve 127, the fluid current can preferably be transported from the reservoir 147 to the pump P' essentially directly into the space 168, whereby the fluid can then flow into the space A'. Consequently, on the side of the piston 118 facing away from the converter housing 113 there can preferably be an overpressure $P_1'$ (see FIG. 7b) which displaces the piston 118 toward the internal combustion engine, and thus preferably brings the piston 118 into contact, by means of the friction linings 160 and plate 144, with the converter housing 113. As a result of the friction between the piston 118 and the converter housing 113 with the corresponding friction lining 160, there can preferably be a non-rotational connection between the piston 118 and the housing 113. As such, a torque can be transmitted from the converter housing 113, which converter housing 113 is preferably turning with the engine, and the piston 118 via the plate 144 to the turbine wheel 107, and, via the gear teeth 145 of the turbine hub 115, essentially directly to the driven shaft 126. The torque is thus transmitted directly, preferably bypassing the converter circuit.

In accordance with one embodiment of the present invention, at least a portion of the converter fluid from the space 168 can preferably enter space A' through a hole 112a (see FIG. 7b) in the wall 107a of the turbine wheel 107.

A portion of the oil pressed by the piston 118 against the converter housing 113 preferably travels radially outward into the vicinity of the plate 144, where under the action of the differential pressure from the chamber 138, the oil can flow radially inward through the channels 162. In other words, and in accordance with one embodiment of the present invention, as the piston 118 presses against the housing 113, a portion of the oil can preferably be forced radially outward in essentially all directions with respect to the plate 144. Then, because of the lower pressure in chamber 138, the oil can then preferably move into chamber 138 via the channels 162, and radially towards the axis 105. As mentioned above, channels 29, in accordance with the present invention, can preferably be located in the areas 119 and 120 of the piston 118 and the housing 113, respectively. Consequently, the friction linings 160, but primarily the areas 119 and 120 of the piston 118 and the converter housing 113 can preferably be cooled, which can be particularly important when the lock-up clutch 116 is operated with slip.

After the oil flows through the channels 29, it arrives in the chamber 138 where, flowing through the chamber 138, it can also cool the areas of the piston 118 and the converter housing 113 which are more radially inward, preferably before the oil travels through the holes 137 into the blind hole 139 of the space 167. During rotation of the converter housing 113 around the converter axis 105, without special precautions, a Coriolis force could develop possibly leading to an oil vortex. Therefore, the holes 137 can preferably be configured to counteract against the effect of the Coriolis force, so that the individual oil particles can essentially maintain a radially inward flow direction. The holes 137 are thereby continued radially inward until they empty radially inside a zone in which, if the oil particles were not supported against the Coriolis force, a vortex would most likely form, the diameter of which vortex would typically be a function of the angular velocity of the converter housing 113 and of the radial velocity of the oil. Further, the vortex, preferably in the entry area of the longitudinal hole 125 of the driven shaft 126, would typically lead to a significant reduction in the cross section of the oil current, which would most likely in turn interfere with the discharge of the oil into the reservoir 147, in which reservoir 147 the oil can preferably be cooled. A significant drop in pressure in the entry area of the oil into the longitudinal hole 125 would occur in the chamber 138, and would reduce the level of torque which can be transmitted.

Thus, in accordance with one embodiment, converter fluid from the converter circuit can preferably be introduced into chamber 138 via the channels 29, preferably when the piston 118 of the lockup clutch 116 is in an engaged position with the converter housing 113. It should be understood that the converter fluid which enters the chamber 138 during engagement of the lockup clutch 116 can preferably not interfere with the overpressure $P_1'$ which occurs in space A' during engagement of the lockup clutch 116. Further, the converter fluid can be introduced into the channels 29 at a distance of about 12.5 cm from the converter axis 105. Of course, these dimensions are given only by way of example and variations are therefore possible.

On account of the holes 137 which preferably act as flow guide 170 and extend into the zone wherein a vortex could form, the oil particles are no longer held in the circumferential direction only when they are so close to the axis 105 of the converter that significant forces in the circumferential direction are no longer acting on them. They can then be introduced into the longitudinal hole 125 in the driven shaft 126 essentially without any restriction.

Figures 7B, 7C:
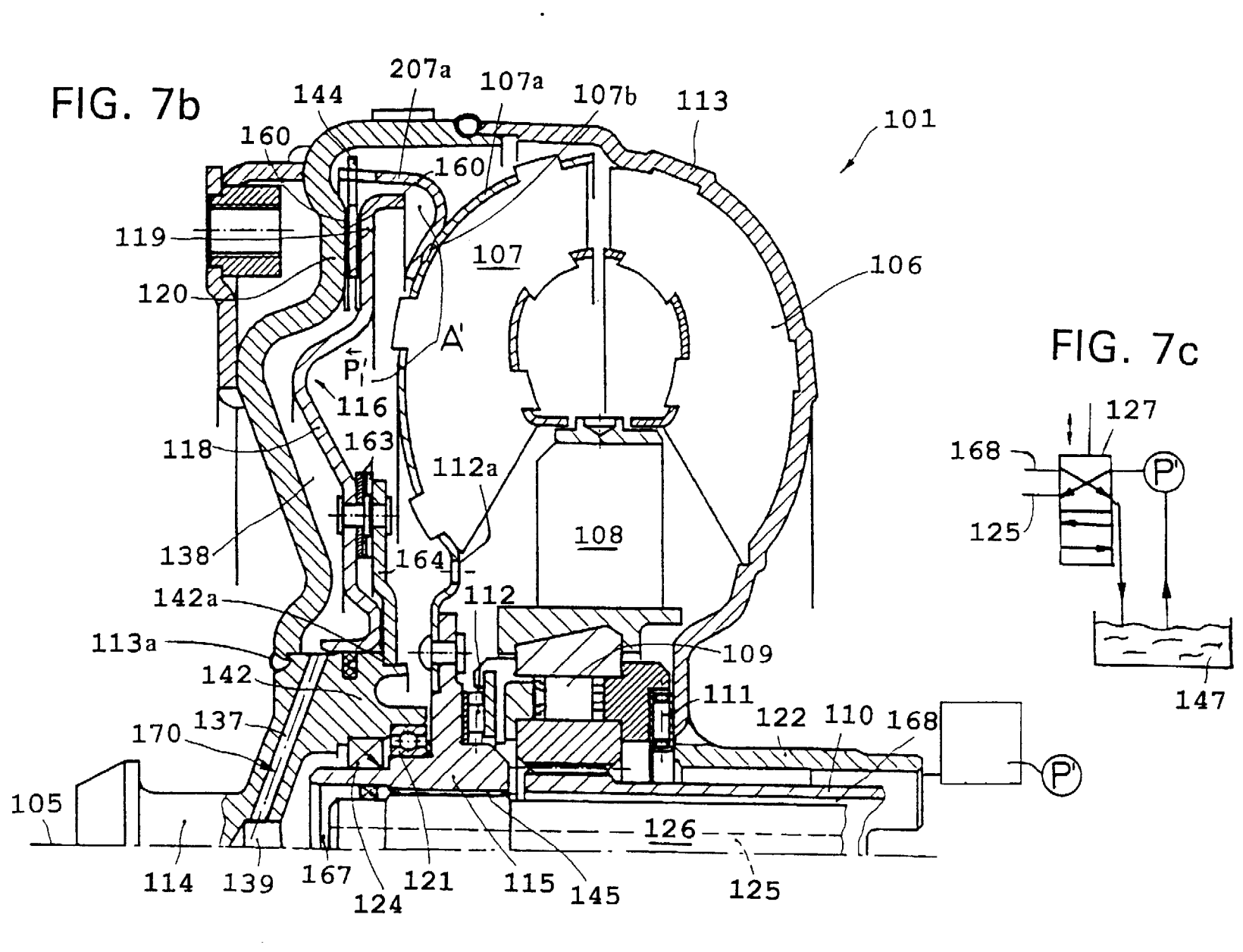

In the second possible position of the multi-way valve 127 shown in FIG. 7c, the pump P' can preferably be connected to the longitudinal hole 125 and the return can be connected to the space 168. In this case, the full pressure of the fluid is transported into the space 167 and via this space 167 and the holes 137 into the chamber 138, as a result of which the piston 118 is displaced to the right and loses its torque-transmission function. In other words and in accordance with one embodiment, the converter fluid can be pumped into the pump P' from the reservoir 147, through longitudinal hole 125 in the driven shaft 126, into the space 167 and blind hole 139, and into the holes 137. Thus, the converter fluid, now moving in the opposite direction from that described above, can preferably serve to cool the friction lining or linings 160 in the opposite direction. Further, once the piston 118 moves away from the converter housing 113, the turbine wheel 107 can preferably be disconnected from the housing 113, and will therefore stop moving at the same speed as the housing 113.

Figure 8:
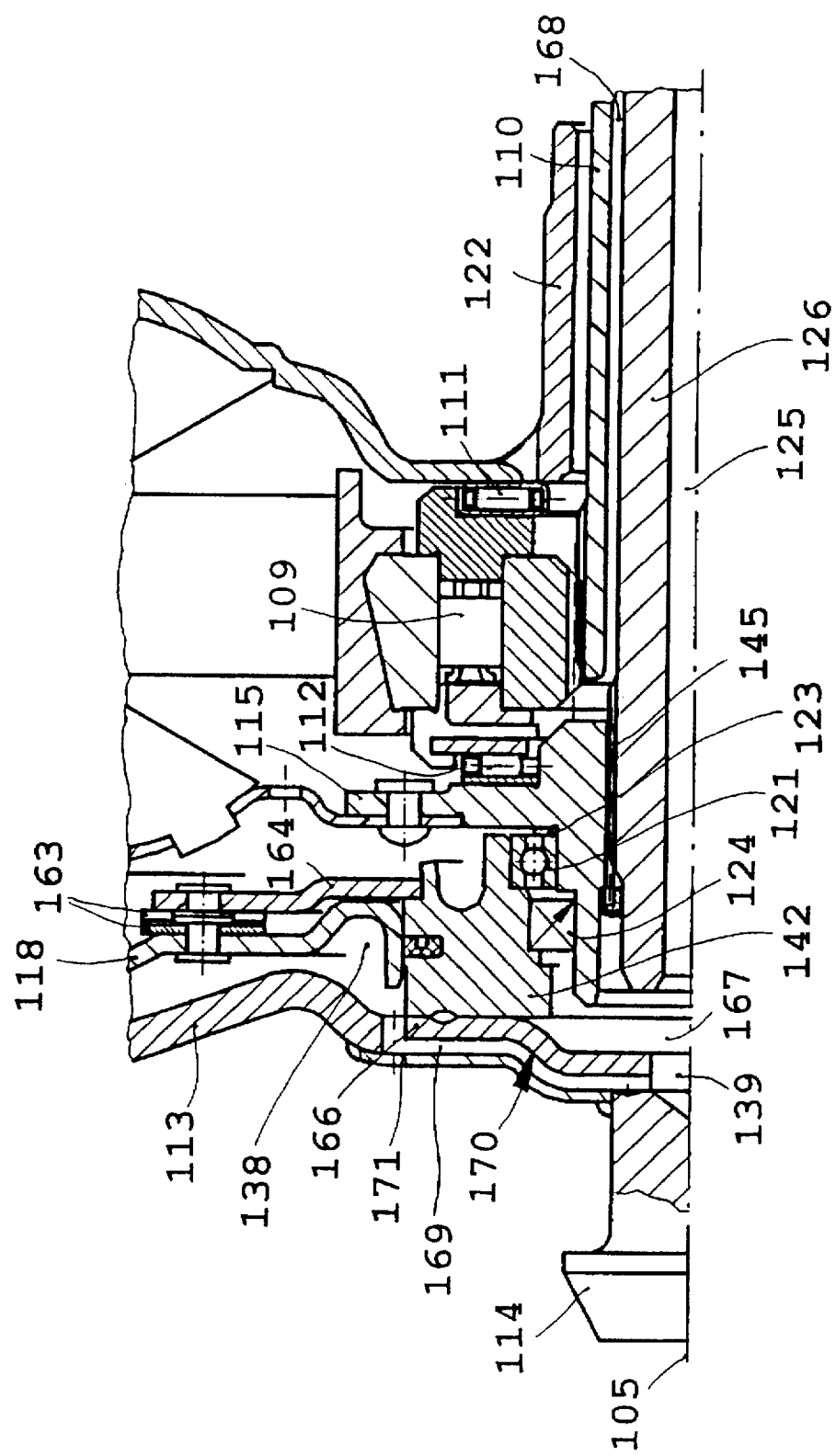
FIG. 8 shows a segment of a torque converter of a similar design, but with flow guides in the form of channels.
Figure 8A:
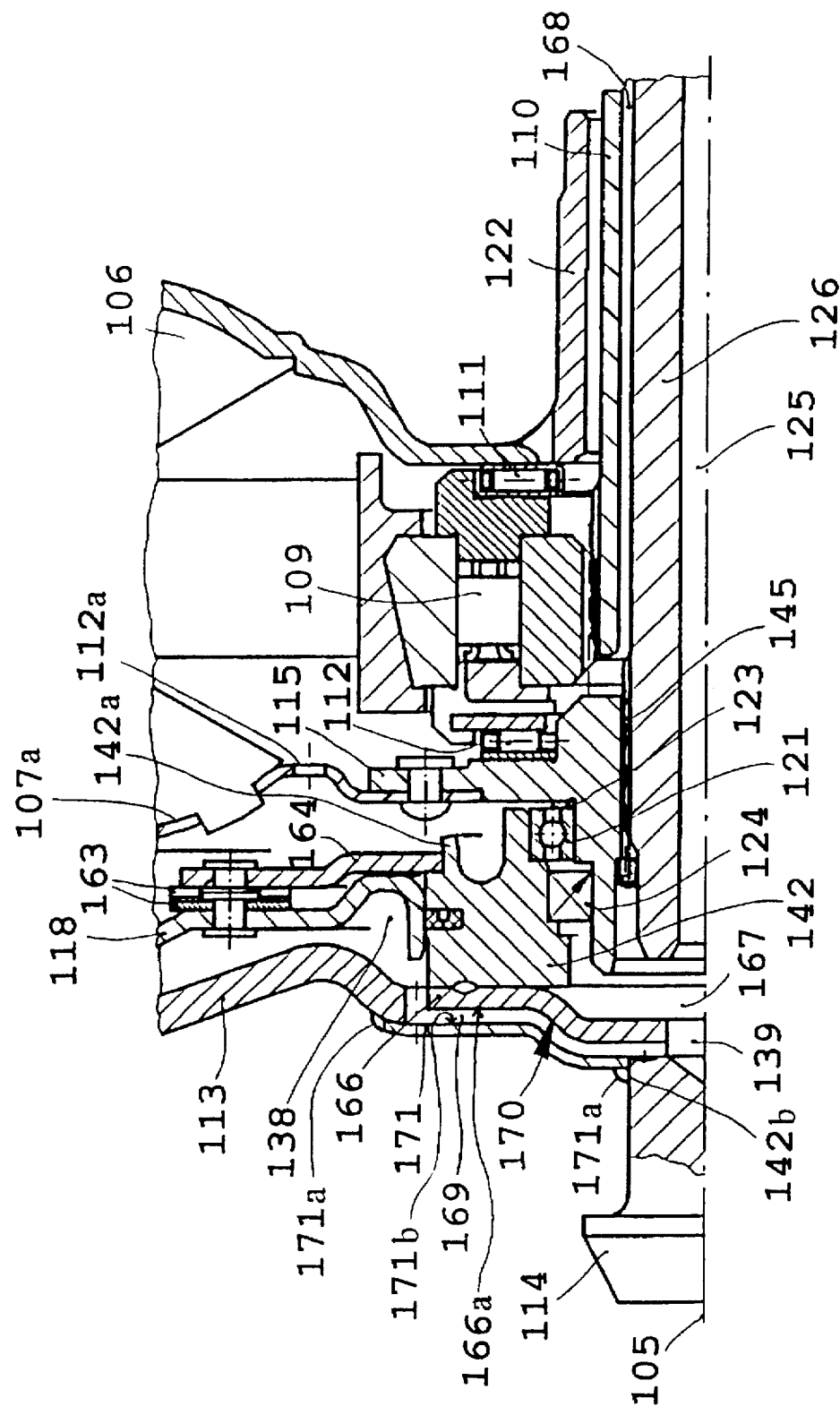
FIG. 8a shows substantially the same view as FIG. 8, but shows additional components.

The torque converter illustrated in FIGS. 8 and 8a is substantially similar to the one illustrated in FIGS. 7 and 7b, with the exception of the area illustrated in detail. The ring plate 164 is preferably connected to the piston 118 by means of leaf springs 163, and can also be connected by its edges to the bearing ring 142. The bearing ring 142 can preferably be connected to a flange-like expanded portion 166 of the bearing neck 114, which flange-like portion 166 can preferably extend radially outward, with respect to axis 105. In accordance with one preferred embodiment, the bearing ring 142 can be connected to the portion 166 by a weld 142b (see FIG. 8a). Axially outside the expanded portion 166, there can preferably be channels 169, which channels 169 can preferably be covered by a cover plate 171. The cover plate 171 can preferably be fastened on one end to the converter housing 113 and on the other end of the bearing neck 114, preferably by means of welds 171a. The channels 169 can preferably act as flow guide 170, which flow guide 170 empties with its end facing the converter axis 105 into the blind hole 139.

To summarize, and in accordance with this embodiment, oil which has flowed through the chamber 138 can preferably be transported via the channels 29 and the blind hole 139 of the space 167 into the longitudinal hole 125 of the driven shaft 126, and thus arrives in the reservoir 147.

In accordance with one embodiment of the present invention, cover plate 171 can preferably have portions which extend axially from an interior surface 171b (see FIG. 8a) of cover plate 171 to an exterior surface 166a of flange-like portion 166. These axial portions can preferably serve to create a plurality of separate channels 169 for directing the flow of oil. Alternatively, the flange-like portion 166 can have axial portions which extend from the surface 166a of the portion 166 to the interior surface 171b of cover plate 171. In accordance with yet an additional embodiment, the flow guide 170 can be one continuous channel 169.

Figure 9:
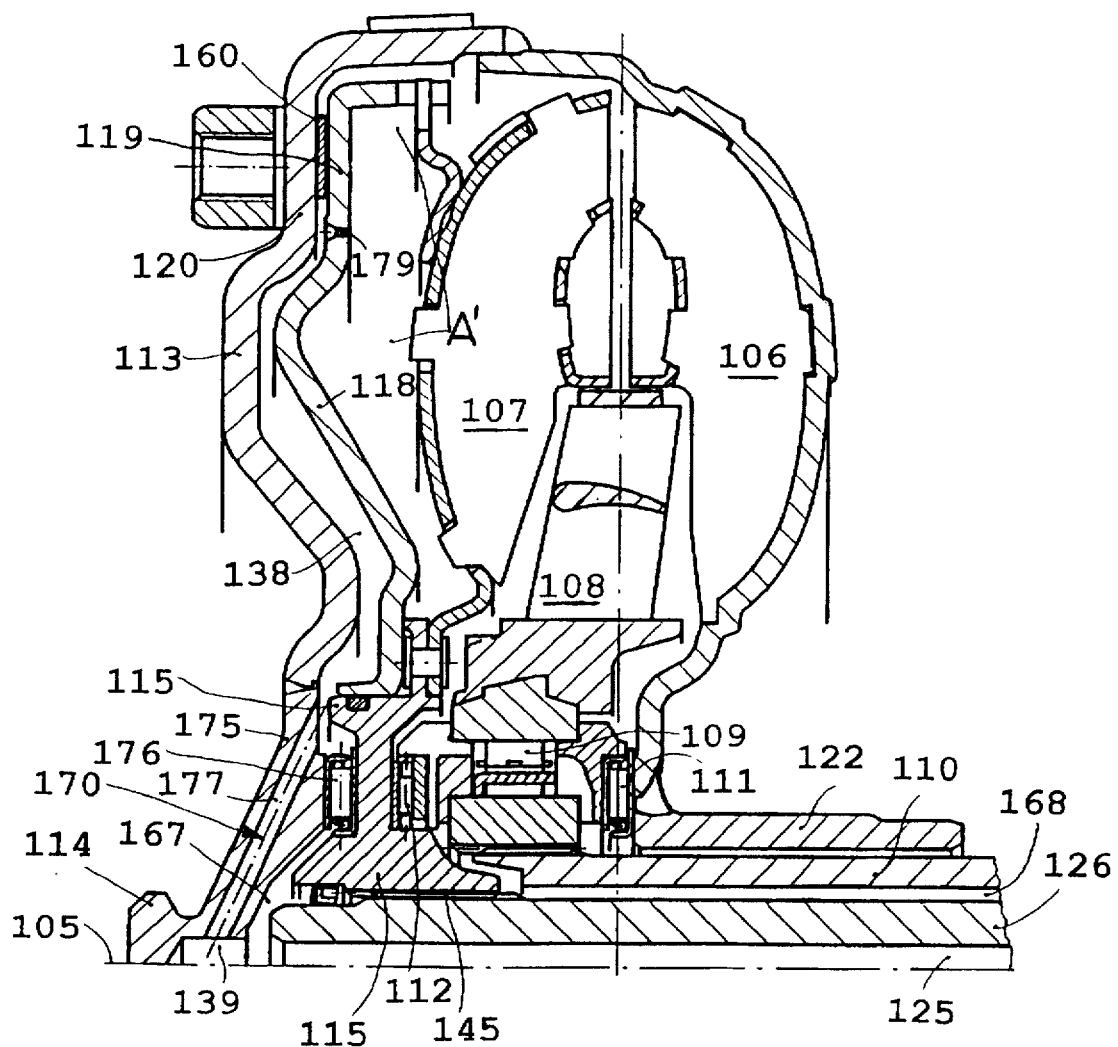
FIG. 9 shows the upper half of a longitudinal section through a torque converter with a different type of bearing of the piston of a lock-up clutch and with flow guides as shown in FIGS. 7 and 7b.
Figure 9A:
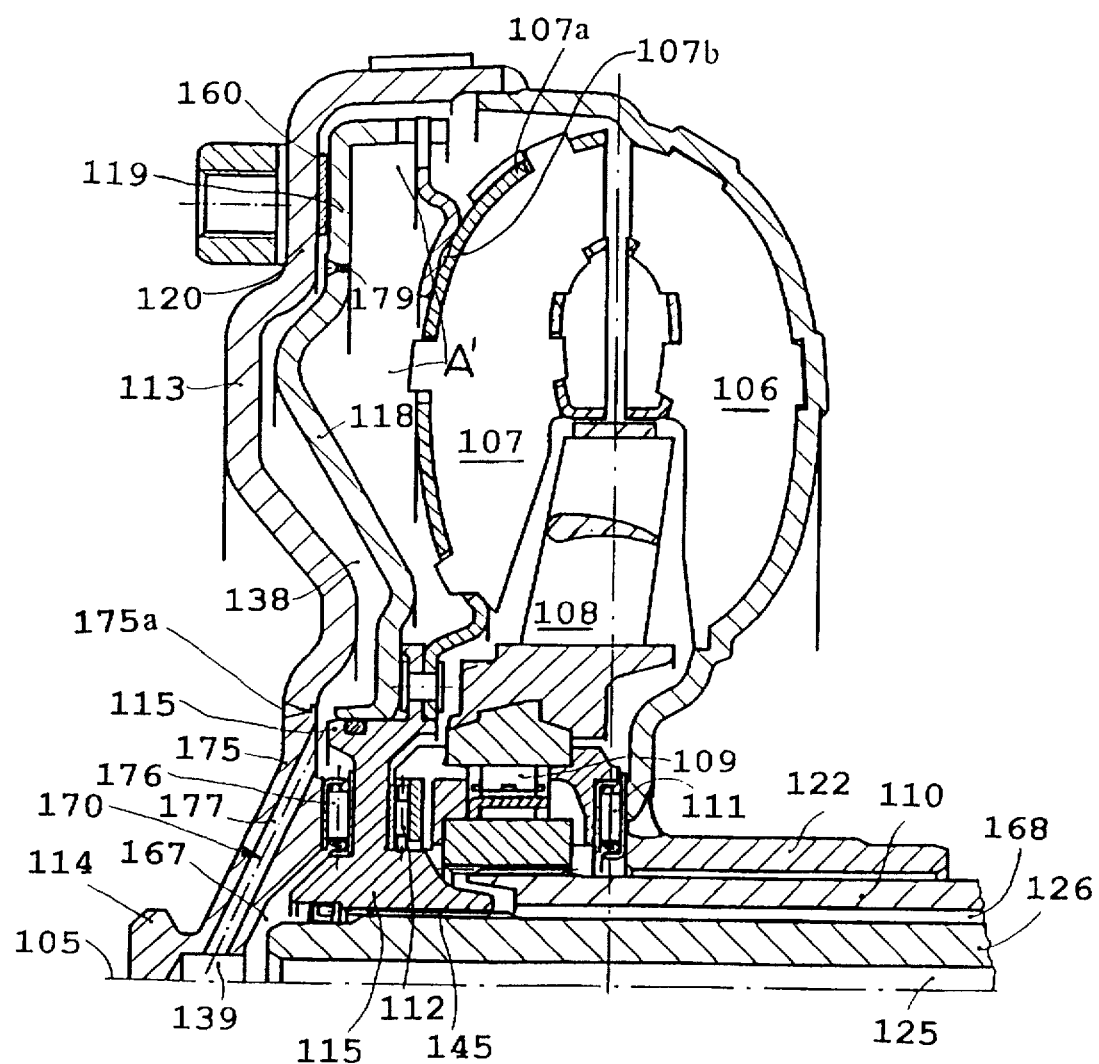
FIG. 9a shows substantially the same view as FIG. 9, but shows additional components.

FIGS. 9 and 9a show a torque converter which differs from FIGS. 7, 7b, 8 and 8a in that the piston 118 can preferably be located on the turbine hub 115 non-rotationally, but so that it can move axially, instead of on the bearing ring 142 as shown in FIGS. 7, 7b, 8 and 8a. The turbine hub 115 can preferably be secured axially between the bearing element 112 and an axial bearing 176. The bearing 176 can preferably be held in an expanded portion 175 of the bearing neck 114, which expanded portion preferably extends radially outward in the manner of a flange. In the expanded portion 175, a hole 177 acting as a flow guide 170 runs diagonally radially outward, and empties on one end in the chamber 138 and on the other end in the blind hole 139 of the space 167. Further, in accordance with one embodiment of the present invention, the expanded portion 175 can preferably be connected to housing 113 by means of a weld 175a.

The piston 118 can preferably be provided on its radial area 119 with a friction lining 160 which can be brought into contact with the area 120 of the converter housing 113. The area 120 can preferably be designed with channels 29, in accordance with the present invention in the area over which the friction lining 160 extends. Radially inside the friction lining 160, the piston 118 can preferably be provided with openings 179, which openings 179 have a very small diameter.

A portion of the oil which generates the application force of the piston 118 against the converter housing 113 can preferably flow through the openings 179 and can thereby arrive radially just inside the friction lining 160 in the chamber 138, where as it flows, it cools both the piston 118 and the converter housing 113 radially inside the friction lining 160. Consequently, the heat generated in the area covered by the friction lining 160 can be discharged radially inwardly relatively quickly. The oil leaves the chamber 138, enters the holes 177 and, after passing through the blind hole 139 of the space 167, can preferably reach the longitudinal hole 125 in the driven shaft 126.

Further, and in accordance with one embodiment of the present invention, the converter fluid which is forced between areas 119 and 120 can be directed through the channels 29 and can thus serve to cool the friction lining 160 and can also serve to cool the area 120 of the housing 113, as described above with regard to the embodiments shown in FIGS. 7, 7b, 8 and 8a.

In accordance with one embodiment of the present invention, the converter fluid can preferably be introduced from the converter circuit into channels 29 at a distance of about 13 cm from the converter axis 105. Further, the portion of the converter fluid which enters the openings 179 can preferably enter the openings 179 at about 11 cm from the converter axis. Of course, these dimensions are given only by way of example and variations are therefore within the scope of the present invention.

Types of torque converters and components therefor, which may be utilized in accordance with the embodiments of the present invention may be found in the following U.S. Pat. No. 4,478,323 to Weissenberger on Oct. 23, 1984, entitled "Hydrodynamic Clutch with Torsional Vibration Damping"; U.S. Pat. No. 4,437,551 to Gimmler on Mar. 20, 1984, entitled "Hydrodynamic Torque Converter"; U.S. Pat. No. 5,065,853 to Fujimoto et al. on Nov. 19, 1991, entitled "Lockup Clutch of Torque Converter"; U.S. Pat. No. 4,468,989 to Rosen on Sep. 4, 1984, entitled "Power Transmission Mechanism with a Hydrokinetic Torque Converter Having a Lockup Clutch"; U.S. Pat. No. 4,382,496 to Yamamori et al. on May 10, 1983, entitled "Torque Converter with Lockup Clutch Unit"; and U.S. Pat. No. 4,071,125 to Jameson on Jan. 31, 1978, entitled "Power Transmission with Torque Converter Lockup Clutch".

U.S. Pat. No. 5,215,173 issued to Gimmler on Jun. 1, 1993 and entitled "Hydrodynamic Torque Converter" is the U.S. counterpart of German Patent No. 41 21 586 A1 and is hereby expressly incorporated by reference herein.

One feature of the invention resides broadly in the hydrodynamic torque converter with a lock-up clutch, which comprises a piston which can be extended in the axial direction and can be connected to the converter housing by means of at least one friction lining, whereby in the vicinity of the friction surface, there are a multiplicity of depressions for the flow of hydraulic fluid, preferably oil, from the converter circuit, which run between the radially outside and the radially inside edge of the friction lining at a specified angle in the circumferential direction and at a changing radial distance from the axis of rotation of the friction lining, characterized by the fact that in each depression 17 between each inlet 23 and a corresponding outlet 26 for the oil, the longitudinal direction of the depression 17 is changed by at least one reversal or change of course 28 such that its radial component is oriented opposite to the direction before the reversal 28.

Another feature of the invention resides broadly in the hydrodynamic torque converter characterized by the fact that the depression 17 preferably experiences a change in its longitudinal direction at each of the edges 22, 25 of the friction lining 4.

Yet another feature of the invention resides broadly in the hydrodynamic torque converter characterized by the fact that the depression 17 has an expanded portion 24 in the vicinity of a reversal 28.

Still another feature of the invention resides broadly in the hydrodynamic torque converter characterized by the fact that the inlet 23 is connected to a multiplicity of channels 29 by means of a junction 30.

A further feature of the invention resides broadly in the hydrodynamic torque converter characterized by the fact that a multiplicity of channels 29 empty by means of a funnel or 31 into a common outlet 26.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

The corresponding foreign patent publication applications, namely, Federal Republic of Germany Patent Application No. P 44 32 624.6, filed on Sep. 14, 1994, having inventors Uwe Dehrmann, Peter Volland and Hans-Willhelm Weinholt, and DE-OS P 44 32 624.6 and DE-PS P 44 32 624.6 are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

We claim:

1. A hydrokinetic torque converter, said hydrokinetic torque converter including a lockup clutch, said hydrokinetic torque converter comprising:

a torque input shaft defining a rotational axis;

a torque output shaft;

a converter housing, said converter housing comprising means for being driven by said torque input shaft;

a pump wheel disposed within said converter housing and comprising means for being driven by said converter housing;

a turbine wheel disposed within said converter housing and in spaced opposition to said pump wheel along said rotational axis, said turbine wheel comprising means for driving said torque output shaft;

a piston in spaced opposition to said converter housing along said rotational axis;

at least one friction lining disposed between said piston and said converter housing;

said piston being displaceable along said rotational axis to abut said at least one friction lining;

a first fluid chamber containing a substantially viscous fluid, said first fluid chamber being disposed between said converter housing and said piston;

a second fluid chamber containing said substantially viscous fluid, said second fluid chamber being disposed within said converter housing and surrounding said pump wheel and said turbine wheel;

at least one fluid passage for the flow of said substantially viscous fluid between said first and second fluid chambers, through said at least one fluid passage, said at least one fluid passage extending adjacent said at least one friction lining;

said at least one fluid passage having an inflow portion for the inflow of said substantially viscous fluid thereinto;

said at least one fluid passage having an outflow portion for the outflow of said substantially viscous fluid therefrom;

said at least one fluid passage having a longitudinal direction along its length;

said longitudinal direction of said at least one fluid passage having a corresponding radial component substantially aligned along a radius of said rotational axis;

said at least one fluid passage having at least one change of said longitudinal direction between said inflow portion and said outflow portion wherein said corresponding radial component undergoes a reversal of direction.

2. The hydrokinetic torque converter according to claim 1, wherein said at least one fluid passage is formed in at least one of: said at least one friction lining, said piston and said converter housing.

3. The hydrokinetic torque converter according to claim 2, wherein said at least one fluid passage comprises a channel formed in the surface of said at least one of said at least one friction lining, said piston and said converter housing, said channel having at least one portion that is substantially nonlinear in a plane adjacent to said at least one friction lining.

4. The hydrokinetic torque converter according to claim 3, wherein said channel includes a substantially radially outwardly disposed inlet and a substantially radially inwardly disposed outlet.

5. The hydrokinetic torque converter according to claim 4, wherein said at least one fluid passage comprises a plurality of channels formed in the surface of said at least one of said friction lining, said piston and said converter housing, each of said plurality of channels having a radially outwardly disposed inlet, a radially inwardly disposed outlet and at least one portion that is substantially nonlinear in said plane adjacent to said at least one friction liner.

6. The hydrokinetic torque converter according to claim 5, wherein each of said plurality of channels comprises at least two arcuate portions, a first of said at least two arcuate portions being disposed radially inward and a second of said at least two arcuate portions being disposed radially outward.

7. The hydrokinetic torque converter according to claim 6, said hydrokinetic torque converter additionally comprising an expanded reservoir channel portion provided at each of said at least two arcuate portions.

8. The hydrokinetic torque converter according to claim 7, wherein said plurality of channels are provided on a surface of said at least one friction lining.

9. The hydrokinetic torque converter according to claim 8, wherein said hydrokinetic torque converter additionally comprises a disc member interposed between said piston and said converter housing, said at least one friction lining being provided on a surface of said disc member, said radially outwardly disposed inlet being provided on a radially outward edge of said disc member, and said radially inwardly disposed outlet being provided on a radially inward edge of said disc member.

10. The hydrokinetic torque converter according to claim 7, wherein said first of said at least two arcuate portions is shaped convexly radially inward and said second of said at least two arcuate portions is shaped convexly radially outward.

11. The hydrokinetic torque converter according to claim 10, wherein each of said plurality of channels-comprises a pair of channels, a first of said pair of channels comprising said radially outwardly disposed inlet, said convexly radially inward arcuate portion, and a junction with a second of said pair of channels, and said second of said pair of channels comprising said radially inwardly disposed outlet, said convexly radially outward arcuate portion, and a junction with said first of said pair of channels.

12. The hydrokinetic torque converter according to claim 11, wherein said hydrokinetic torque converter additionally comprises a disc member interposed between said piston and said converter housing, said at least one friction lining being provided on a surface of said disc member, said radially outwardly disposed inlet being provided on a radially outward edge of said disc member, and said radially inwardly disposed outlet being provided on a radially inward edge of said disc member.

13. The hydrokinetic torque converter according to claim 7, wherein each of said plurality of channels comprises a groove formed in said surface of said at least one friction lining, said groove beginning at said radially outwardly disposed inlet positioned on a radially outward edge of said at least one friction lining, said groove terminating at said radially inwardly disposed outlet positioned on a radially inward edge of said at least one friction lining, and said groove comprising a multiplicity of segments, each of said multiplicity of segments being obliquely oriented with respect to a radial line projected from said rotational axis, and adjacent pairs of said multiplicity of segments being, joined by said at least two arcuate portions.

14. The hydrokinetic torque converter according to claim 13, wherein each of said plurality of channels comprises four of said segments and three of said arcuate portions disposed between said inlet and said outlet.

15. The hydrokinetic torque converter according to claim 14, wherein each of said multiplicity of segments is substantially linear over at least a portion of its length, and wherein said hydrokinetic torque converter additionally comprises a disc member interposed between said piston and said converter housing, said at least one friction lining being provided on a surface of said disc member, said radially outwardly disposed inlet being provided on a radially outward edge of said disc member, and said radially inwardly disposed outlet being provided on a radially inward edge of said disc member.

16. The hydrokinetic torque converter according to claim 7, wherein each of said plurality of channels comprises an S-shaped groove beginning at said radially outwardly disposed inlet extending radially obliquely inward to said second radially inward disposed arcuate portion provided with one of said expanded reservoir portions, thereafter extending radially obliquely outward to said first radially outward disposed arcuate portion provided with another of said expanded reservoir portions, and thereafter extending radially obliquely inward and terminating at said radially inwardly disposed outlet.

17. The hydrokinetic torque converter according to claim 16, wherein said hydrokinetic torque converter additionally comprises a disc member interposed between said piston and said converter housing, said at least one friction lining being provided on a surface of said disc member, said radially outwardly disposed inlet being provided on a radially outward edge of said disc member, and said radially inwardly disposed outlet being provided on a radially inward edge of said disc member.

18. The hydrokinetic torque converter according to claim 7, wherein each of said plurality of channels comprises a substantially sinusoidal wave shaped groove formed in and extending circumferentially about said at least one of said at least one friction lining, said piston and said converter housing, a first of said substantially sinusoidal wave shaped grooves being substantially 180 degrees out of phase with respect to a second of said sinusoidal wave shaped grooves, with fluid exchange junctions for the exchange of said substantially viscous fluid being formed at intersections of said first and second substantially sinusoidal wave shaped grooves.

19. The hydrokinetic torque converter according to claim 5, wherein each of said plurality of channels comprises a serpentine groove formed in said at least one of said at least one friction lining, said piston and said converter housing, said serpentine groove extending from said radially outwardly disposed outlet to said radially inwardly disposed inlet and including a multiplicity of arcuate portions; and wherein said hydrokinetic torque converter additionally comprises a disc member interposed between said piston and said converter housing, said at least one friction lining being provided on a surface of said disc member, said radially outwardly disposed inlet being provided on a radially outward edge of said disc member, and said radially inwardly disposed outlet being provided on a radially inward edge of said disc member.

20. A hydrokinetic torque converter, said hydrokinetic torque converter including a lockup clutch, said hydrokinetic torque converter comprising:

a torque input shaft defining a rotational axis;

a torque output shaft;

a converter housing, said converter housing comprising means for being driven by said torque input shaft;

a pump wheel disposed within said converter housing and comprising means for being driven by said converter housing;

a turbine wheel disposed within said converter housing and in spaced opposition to said pump wheel along said rotational axis, said turbine wheel comprising means for driving said torque output shaft;

a piston in spaced opposition to said converter housing along said rotational axis;

at least one friction lining disposed between said piston and said converter housing;

said piston being displaceable along said rotational axis to abut said at least one friction lining;

a first fluid chamber containing a substantially viscous fluid, said first fluid chamber being disposed between said converter housing and said piston;

a second fluid chamber containing said substantially viscous fluid, said second fluid chamber being disposed within said converter housing and surrounding said pump wheel and said turbine wheel;

at least one fluid passage for the flow of said substantially viscous fluid between said first and second fluid chambers, through said at least one fluid passage, said at least one fluid passage extending adjacent said at least one friction lining;

said at least one fluid passage having an inflow portion for the inflow of said substantially viscous fluid thereinto;

said at least one fluid passage having an outflow portion for the outflow of said substantially viscous fluid therefrom;

said at least one fluid passage having a longitudinal direction along its length;

said longitudinal direction of said at least one fluid passage having a corresponding radial component substantially aligned along a radius of said rotational axis;

said at least one fluid passage having at least one change of said longitudinal direction between said inflow portion and said outflow portion wherein said corresponding radial component undergoes a reversal of direction;

said at least one fluid passage additionally comprising an expanded reservoir portion; and said expanded reservoir portion being disposed substantially adjacent said change of said longitudinal direction of said at least one fluid passage where said corresponding radial component undergoes said reversal of direction.

* * * * *